United States Patent
Kahn et al.

[19]

[11] Patent Number: 5,844,544
[45] Date of Patent: *Dec. 1, 1998

[54] VISUAL COMMUNICATIONS APPARATUS EMPLOYING EYE-POSITION MONITORING

[75] Inventors: David Alexander Kahn, Nepean; Jan Heynen, Ottawa, both of Canada

[73] Assignee: H. K. Eyecan Ltd., Ottawa, Canada

[*] Notice: This patent issued on a continued prosecution application filed under 37 CFR 1.53(d), and is subject to the twenty year patent term provisions of 35 U.S.C. 154(a)(2).

[21] Appl. No.: 489,749

[22] Filed: Jun. 13, 1995

[30] Foreign Application Priority Data

Jun. 17, 1994 [CA] Canada ................................. 2,126,142

[51] Int. Cl.$^6$ ..................................................... G09G 5/00
[52] U.S. Cl. ............................................. 345/156; 345/32
[58] Field of Search ...................................... 345/156, 158, 345/2, 7, 8, 25, 26, 32; 351/209, 21; 359/10, 8, 22, 15, 32; 389/103

[56] References Cited

U.S. PATENT DOCUMENTS

| | | | |
|---|---|---|---|
| D. 301,644 | 6/1989 | Sestak | D29/18 |
| D. 352,046 | 11/1994 | Kataoka | D16/309 |
| 3,883,225 | 5/1975 | Rehm | 351/158 |
| 4,573,759 | 3/1986 | Swift | 359/32 |
| 4,595,990 | 6/1986 | Garwin et al. | 364/518 |
| 4,648,052 | 3/1987 | Friedman et al. | 364/550 |
| 4,713,535 | 12/1987 | Rhoades | 250/221 |
| 4,720,189 | 1/1988 | Heynen et al. | 351/210 |
| 4,767,203 | 8/1988 | Zahir | 351/158 |
| 4,790,613 | 12/1988 | Moss | 359/15 |
| 4,811,243 | 3/1989 | Racine | 364/520 |
| 4,836,670 | 6/1989 | Hutchinson | 351/210 |
| 4,847,486 | 7/1989 | Moran et al. | 250/221 |
| 4,891,630 | 1/1990 | Friedman et al. | 345/156 |
| 4,946,271 | 8/1990 | Palsgard et al. | 351/210 |
| 5,060,062 | 10/1991 | Dotson | 351/158 |

(List continued on next page.)

FOREIGN PATENT DOCUMENTS

| | | | |
|---|---|---|---|
| 1417850 | 12/1975 | United Kingdom | B41J 5/08 |
| 2170910 A | 8/1986 | United Kingdom | A61B 5/10 |
| 2271195 | 6/1994 | United Kingdom | 359/400 |

OTHER PUBLICATIONS

*An Eye Transducer For Keyboard Emulation*, J. Heynen and D.A. Kahn, Reprinted from IEEE Communications Society "IEEE Global Telecommunications Conference" Dec. 2–5, 1985, pp. 1063–1065.

*An Eye Transducer For Actuating A Typewriter*, J. Heynen, D.A. Kahn and H. Lukas, Proceedings of the 2nd International Conference on Rehabilitation Engineering, Ottawa 1984, pp. 448–449.

*Primary Examiner*—Chanh Nguyen
*Attorney, Agent, or Firm*—Thomas Adams

[57] ABSTRACT

In an eye-directed communications device which displays characters, for example symbols or letters, and determines a user's selection by monitoring eye position to determine which of the characters is being observed, difficulties in providing for selection of the usual characters and functions of a conventional 101 key computer keyboard are overcome by dividing the required characters/functions into three sets, designated as lower case, upper case and "command" case. In order to select a particular character, the user first selects the case and then selects the character. Only one set need be displayed to the user, the characters in the other sets having spatial correspondence with those in displayed set. The system may also, or alternatively, display the characters in groups and define position selection fields corresponding to the positions of the characters in each group. The user then determines the position of the desired character in its group and makes a character selection by first selecting the corresponding position field. The apparatus then limits subsequent character selection by the user to the subset of characters in the corresponding positions in their groups. Limitation to the subset allows subsequent detection of the selected character to use a larger area than that occupied by the character in the display.

40 Claims, 6 Drawing Sheets

U.S. PATENT DOCUMENTS

| | | | |
|---|---|---|---|
| 5,106,179 | 4/1992 | Kamaya et al. | 351/158 |
| 5,151,722 | 9/1992 | Massof et al. | 351/158 |
| 5,162,828 | 11/1992 | Furness et al. | 351/158 |
| 5,180,907 | 1/1993 | Udden et al. | 250/205 |
| 5,231,674 | 7/1993 | Cleveland et al. | 382/6 |
| 5,270,748 | 12/1993 | Katz | 351/210 |
| 5,274,405 | 12/1993 | Webster | 351/158 |
| 5,345,281 | 9/1994 | Taboada et al. | 351/210 |
| 5,371,556 | 12/1994 | Suwa et al. | 351/158 |

5,844,544

VISUAL COMMUNICATIONS APPARATUS EMPLOYING EYE-POSITION MONITORING

The invention relates to visual communications apparatus which display a set of characters, for example letters or symbols, from which a user makes a selection. The invention is especially, but not exclusively, applicable to such visual communications apparatus which monitors the position of the user's eye to determine which of the characters is being fixed upon.

BACKGROUND ART

Eye-directed visual communications apparatus may be used by people who cannot, or prefer not to, use their hands to operate a manual interface device, such as a keyboard, or communicate orally with, for example, a voice recognition system. Such people include, for example, those with physical disabilities, such as Amyotrophic Lateral Sclerosis (Lou Gehrigs' disease) or quadriplegia, and persons wishing to communicate with workstations, aircraft/spacecraft control systems, industrial or other equipment.

Known eye-directed communications devices, such as those disclosed in U.S. Pat. Nos. 4,720,189, 4,836,670, 4,648,052 and 4,595,990, typically include two basic elements, namely a chart of characters which is displayed to the user, hereafter referred to as a "keychart", and an "eye-tracker" i.e. a detection system which determines eye position and estimates which character is under observation by the user. In this specification, the term "character" will not only be used to refer to an individual letter or symbol, but also to refer to a series or group of letters or symbols, perhaps identifying a function. Some known eye-directed communications devices have the keychart remote from the user while others have it attached to the user's head. In the former case, both eyes are unobscured but monitoring of eye position is complicated by head and body movements. In the latter case, one eye is obscured by an eyepiece containing the keychart leaving only the other eye to observe external displays such as a computer monitor.

Some devices, such as that disclosed in U.S. Pat. No. 4,720,189, provide visible feedback information to the user by highlighting, perhaps by backlighting, the character which the equipment estimates as under observation. This gives the user a good sense of being in control. In the remainder of this document, only the term "highlight" will be used to embrace highlighting, backlighting or any other form of visual feedback to indicate to the user the character the system determines to be under observation.

In order to use the eye-directed communications device, the user must usually follow a particular "protocol" or sequence of actions in order to select a character and send it to the associated equipment, which might be a simple character display or a computer for word processing or any other purpose. Preferably, the protocol is capable of being implemented entirely by eye movements, i.e., without requiring inputs from mechanical devices such as pushbuttons or puff/blow switches, sometimes referred to as ability switches. However, if such inputs are available, they may improve the speed and reliability of operation for some users.

Before selection of characters can begin, the equipment must be calibrated or trained to interpret the eye movements of the user, each user being different in this respect. Known training or calibration protocols, such as that disclosed in U.S. Pat. No. 4,595,990, involve the user in fixating the eye upon a series of aiming points or locations on the keychart which are displayed or highlighted as a prompt or cue.

Known training or calibration procedures require the user to keep up with the prompting highlights which identify the sequence of learning points. Some users may find this puts them under pressure, causing difficulty or discomfort. Furthermore, they may become confused by the change of function of the highlight, which leads (prompts) the eye during the training sequence but follows (confirms) the eye movement during the subsequent operation of the equipment.

Once the system has been calibrated, the user can begin selecting characters. Some known devices require the user to select a character by simply dwelling on the selected character for a minimum period of time, for example a half second. The eye-monitoring system will then detect the field of the display upon which the eye is fixed and hence determine the corresponding character. Other devices require the user to fix his/her gaze firstly upon the selected character field to identify the character and then upon a confirmation field to confirm the selection. Completion of the selection is generally confirmed to the user by an audible tone and/or a visual cue in the form of a brief interruption of the highlight on the keychart.

Such known eye-directed devices are susceptible to one or more of a variety of problems and difficulties. For example, the number of selection fields available may be insufficient to meet the needs of the more sophisticated user. If more fields are provided, they must be smaller and therefore more difficult to select reliably.

Another problem arises where the device is associated with one eye and the user uses the other eye to view a computer monitor or other display. The user may occasionally wish to review the monitor at length. Since the two eyes normally track each other, while reviewing the monitor or display, the user may inadvertently initiate action by the eye-tracker. Furthermore, when in this review mode, the user will not wish to be distracted by the tracking highlight.

Where actual character selection is determined by a single dwell interval, the user may feel constantly under pressure, almost harassed, to select the next character because, as soon as a character is selected, the equipment is primed and "counting down" for the next selection. The user is given no opportunity to review the keychart at length or thoughtfully plan before the next selection. Provision of a "rest" location upon which the eye should dwell when no action is required would be rather unnatural and stressful. Provision of a "turn on/turn off" toggle field would be undesirable since time would be wasted selecting it twice between successive character selections. Moreover, some users may find it difficult to move on immediately to the next selection and will thus involuntarily re-select the last character.

Where character selection is determined by two dwell localities, extra time and user concentration are required. Also, the confirmation field must be well separated from the character fields to prevent unwanted confirmations. This reduces the overall zonal area allowed for character fields; which area is a limited and valuable resource. There is also the possibility of selecting an unwanted character whose field is the path traversed in shifting the gaze from the selected character to the confirmation field. Increasing the dwell time to reduce the likelihood of this happening would slow the selection process considerably.

SUMMARY OF THE INVENTION

The various aspects and embodiments of the present invention each seek to eliminate, or at least mitigate, one or more of the afore-mentioned problems and disadvantages.

Accordingly, one aspect of the present invention comprises an eye-directed device which has a training protocol in which fields upon which the user gazes for calibration purposes are subsequently highlighted.

According to another aspect of the invention, there is provided visual communications apparatus comprising:

display means for displaying characters in a field of view of a user's eye, the characters being arranged in a plurality of groups, each character occupying in its group one of a plurality of positions which positions are similar for all groups;

user-controlled means for controlling light to select one of said plurality of characters; and comprising detection means for detecting changes in said light and providing corresponding position signals, and processor means defining boundaries of a plurality of selection fields and determining, in response to the position signals, which of the selection fields has been selected by the user;

the selection fields comprising character selection fields and position selection fields, the processor means being responsive to an initial selection of a position selection field to limit subsequent selection to a subset of said characters which each occupy a corresponding position in each group, and subsequently determining from the position signals the specific one of said subset of characters chosen by the user.

According to another aspect of the present invention, visual communications apparatus comprising: display means for displaying characters in a field of view of a user's eye, user-controlled means for controlling light to select one of said plurality of characters and comprising detection means for detecting changes in said light and providing corresponding position signals, and processor means defining boundaries of a plurality of selection fields comprising character selection fields and case selection fields, and determining in response to the position signals which of the selection fields has been selected by the user;

the processor means storing a plurality of sets of characters and being responsive to an initial user-selection of a case selection field to limit subsequent selection to a corresponding one of said sets of characters, and subsequently to user-selection of a character selection field to determine the character selected by the user.

The apparatus of either aspect may be arranged to deactivate all but a relatively small one of the selection fields following selection of a character, neither responding to the user's eye position nor highlighting characters, and to reactivate the remaining selection fields following selection of the one selection field. Such an arrangement permits the user to view an external monitor or other environment indefinitely. Preferably, the reactivation selection field is located within a peripheral zone of the display, permitting the user to scan the interior portion of the display without initiating action by the system. The reactivation field may also serve another purpose, depending upon the selection sequence. In particular, it may be a case selection field.

According to another aspect of the present invention, visual communications apparatus comprises:

a viewing port and display means for displaying characters for viewing by a user's eye by way of the viewing port; and eye-position monitoring means for monitoring eye-position of a user to determine a character selected by the user, the eye-position monitoring means comprising a dichroic beam splitter for transmitting visible light incident thereupon along a first optical path and reflecting infrared light incident thereupon along a second optical path, the display means being disposed in the first optical path and infrared light source means and infrared receiver means being disposed in the second optical path, the arrangement being such that infrared light from the infrared light source means is reflected via the beam splitter towards the viewing port, infrared light from the viewing port is reflected towards the infrared light receiver means, and visible light from the display means is transmitted by the beam splitter towards the viewing port.

The display may be dimensioned and positioned so as to subtend an angle of between 25 degrees and 40 degrees to the eye of the user.

Preferably, the display comprises a keychart dimensioned and positioned so as to subtend an angle of about 35 degrees to the eye, and has an inner field dimensioned to subtend an angle of at least 20, and preferably about 30 degrees.

In preferred embodiments of the invention, the monitoring means has two modes of operation, namely case selection mode and character selection mode, and three sets of characters. When case selection is complete, the system enters character selection mode. When character selection is complete, the system returns to case selection mode.

Advantageously, following selection of either a case selection field or a character selection field, the system may also requires selection of a confirmation field permitting the eye to scan the display after making a case/character selection.

Visual communications devices according to the present invention may simulate a computer keyboard, in which case selection of a character by the user will cause the system to supply codes, for example ASCII codes, to a display causing it to display letters, symbols and punctuation. Additionally or alternatively, the system may output code corresponding to function keys of a typical computer keyboard, such as F1–F12, CTRL, ALT and so on, which can be used to control a separate computer. In addition, selection of certain characters will initiate a function within the system itself, such as a reset function, or dwell time adjustment. Hence, in this specification, the word "character", in the context of its selection and the consequences of its selection, is used to embrace letters, symbols or descriptions of the above functions.

Various objects, features and advantages of the present invention will become more apparent from the following detailed description, taken in conjunction with the accompanying drawings, of a preferred embodiment of the invention.

DESCRIPTION OF THE PREFERRED EMBODIMENT(S)

Figure 1:
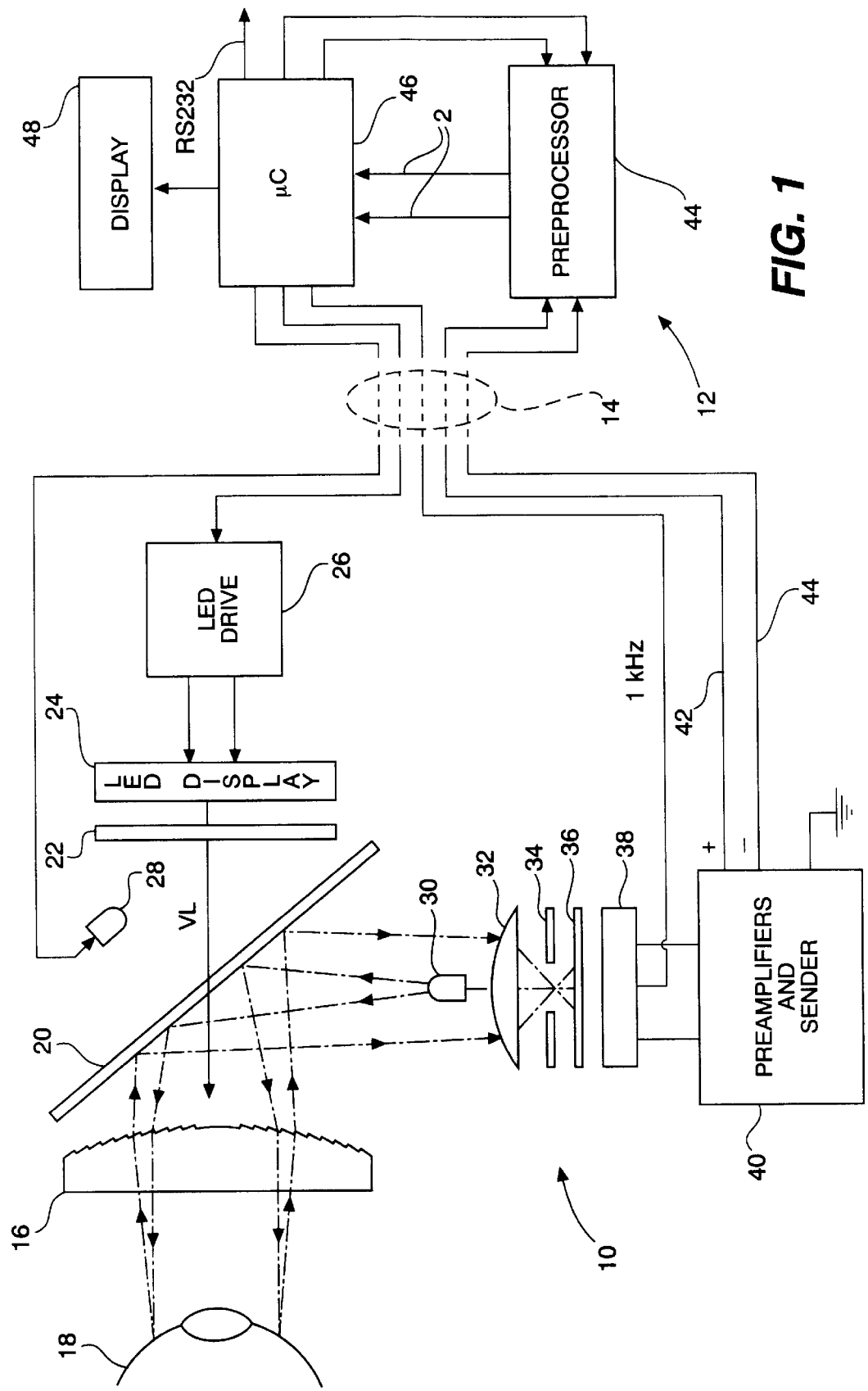
FIG. 1 is a schematic diagram of a visual communications device embodying the invention.

The device illustrated in FIG. 1 comprises an eyepiece unit 10 and a processing and display unit 12 interconnected by an "umbilical" cable 14. The eyepiece unit 10 is mounted upon an eyeglass frame (not shown) and obscures one of its lens openings.

The eyepiece unit 10 comprises a viewing port represented in FIG. 1 by a Fresnel eyepiece lens 16 which is disposed, in use, in front of one eye 18 of the user, and a dichroic beam splitter 20 positioned adjacent the lens 16 and extending obliquely across its optical axis. The dichroic beam splitter 20 extends in a plane which is vertical, in use, and transmits visible light and reflects infrared light. A keychart 22 is positioned in the transmission path of the dichroic filter 20. The keychart 22 comprises a display of characters and can be backlit by a light emitting diode (LED) matrix 24 controlled by a drive circuit 26. The drive circuit 26 comprises a serial-top-parallel converter and is supplied by a serial digital signal via the umbilical cable 14. The serial digital signal determines which LEDs are to be illuminated. A separate incandescent lamp 28 illuminates the front of the keychart 24. The user views keychart 22 via the beam splitter 20 and lens 16.

A pair of infrared LEDs 30 (only one shown) disposed in the reflection path of the beam splitter 20 are spaced apart vertically, one each of an optical receiver assembly 21 so as to direct respective infrared (IR) light beams onto opposite edge portions of the beam splitter 20 which reflects them onto the lens 16 and thence onto the user's eye 18. The IR LEDs 30 are supplied by a 1 kilohertz square waveform power signal supplied from the control and display unit 12 via the umbilical cable 14. Infrared light reflected from various part of the eye 18 passes through the lens 18 in the reverse direction and is reflected by beam splitter 20 onto the infrared optical receiver assembly 21 which comprises, in succession, a focusing or imaging lens 32, an aperture 34, an infrared filter 36 and a multi-element (four-quadrant) silicon photodiode sensor 38. The filter 36 blocks visible light which might have entered via the lens 16 or from the keychart 22 and lamp 28. The infrared light returning from the eye 18 is directed onto the photodiode sensor 38 which functions as a four-pixel camera and supplies corresponding electrical output signals to a preamplifier unit 40 which has a preamplifier for each quadrant. The preamplifiers are cross-coupled so as to supply to the power lines of the preamplifier unit 40 square wave signals varying in amplitude and sign as the difference between the signals from diagonally opposite quadrants, conveniently expressed as A–C and B–D (assuming the clockwise sequence A, B, C, D) and modulated onto its positive and negative power supply lines 42 and 44, respectively, which pass via the umbilical cable 14 to the display and control unit 12. In addition to reducing the number of signals to pass along the umbilical cable 14, this also partially cancels out common mode optical interference.

The control and display unit 14 comprises a preprocessor 44 which comprises an amplifier, a synchronous demodulator or phase sensitive detector (PSD), and a low pass filter (not shown) for power line 42, and a similar amplifier, PSD and filter for power line 44. The outputs of the low pass filters, which comprise the A–C and B–D signals converted to the DC to 10 Hz. spectral region, are applied to summing and differencing amplifiers which create the signals A+B–C–D and A+D–B–C. These two signals are applied to an automatic gain control (AGC) and offset circuit, controlled by a microcontroller 46. The two signals output from the AGC and offset circuit are applied to A–D converter inputs of the microcontroller 46. The microcontroller 46 sets the AGC and offset levels during the training period to adapt the detection system to the particular user's eye.

The microcontroller 46 samples the analog signals at the A–D inputs every 20 milliseconds and determines from them, depending upon the instant mode of operation, the character field or case selection field/confirmation field at which the eye is gazing. The signal processing used to determine the position of the eye 18 at any particular instant, and hence the area of the keychart 22 being viewed, will not be described in detail here. For examples of such signal processing, the reader is directed to the prior patent documents cited in the introductory part of this specification.

The microcontroller 46 supplies signals to a liquid crystal display (LCD) unit 48 to display characters selected by the user and also supplies output signals to an RS 232 port enabling corresponding signals to be supplied to an ancillary device, for example a computer or computer peripheral equipment. The RS 232 port could also be used to supply certain kinds of display device, printers, and other peripheral equipment. Where the ancillary device is a computer, the microcontroller 46 may be programmed with, for example, ACCESS DOS—an IBM applique program—so that the eye-directed device simulates a keyboard for the computer. In addition, it supplies, via the umbilical cable 14, the 1 kilohertz drive signals for the IR LEDs 30 and the serial digital signal to the drive circuit 26 for turning on selected ones of the LED backlighting array 24. The microcontroller 46 determines, by way of the serial digital signal, which of the LEDs in array 26 will be illuminated at any particular time depending upon the user's various selections.

The eye-position detection system, comprising the infrared optical system for illuminating the eye and detecting infrared light returning from the eye, and the associated signal processing circuitry, is designed to allow the user to select the same functions and characters that would be provided by standard computer keyboard. The usual IBM PC computer keyboard, with 101 keys, is highly redundant in order to facilitate its use in certain applications. Nevertheless, the keyboard allows 134 key commands as follows:

48 standard two case keys with case selection by "SHIFT";
(This includes the space bar which is the same in both cases);
12 function keys (F1 through F12)
16 single case control keys (Esc, Caps Lock, Shift, Ctrl, Alt, Enter, Backspace, Insert, Delete, Home, End, Page Up, Page Down, Scroll Lock, Num Lock);
3 two case control keys (Tab/Backtab, Print Screen/SysRq, Pause/Break);
4 Cursor control keys (Up, Down, Left, Right).

This adds up to 134 selections. Additionally, some programs may not distinguish between left shift and right shift, adding another.

Apple computers also have an "Apple" command key.

The eye-directed communications device of the present invention provides for the following additional key functions:

(a) Reset; (b) On/Off (toggle); (c) Fast and Slow; (d) an alarm key to summon help; (e) a Glossary key to aid in recalling a few standard words; (f) a cursor/mouse key to enter a more graphical mode; (g) a volume key to turn sound on or off; (h) a help key to display information in the monitor.

Hence, the user should be able to make any one of 144 selections by means of the present system. It has been found that, for ease of implementation and comprehension, each character field, i.e. the area which would accommodate any one of the characters, should be dimensioned so as to subtend to the user's eye an angle of approximately 4 to 5 degrees. Experience has shown that the entire keychart should preferably subtend a viewing angle no larger than about 30 to 35 degrees, since the user will view both the keychart 22 and the external display 48 and/or a computer monitor. It would be impractical, therefore, for the keychart 22 to display all 144 characters.

In embodiments of this invention, therefore, the keychart 22 displays a first set of 49 characters as a primary or "lower case" set from which the user may select by first selecting "lower case" and then selecting the appropriate character field. The user may select from a second, "upper case" set of characters by first selecting "upper case" and then selecting the appropriate character field, or select a third case by first selecting "COMMAND case" and then selecting the appropriate character field. (The third case will be referred to as the COMMAND case in this description). Hence, the total potential number of characters which can be selected is 147, leaving three spare.

Figure 2:
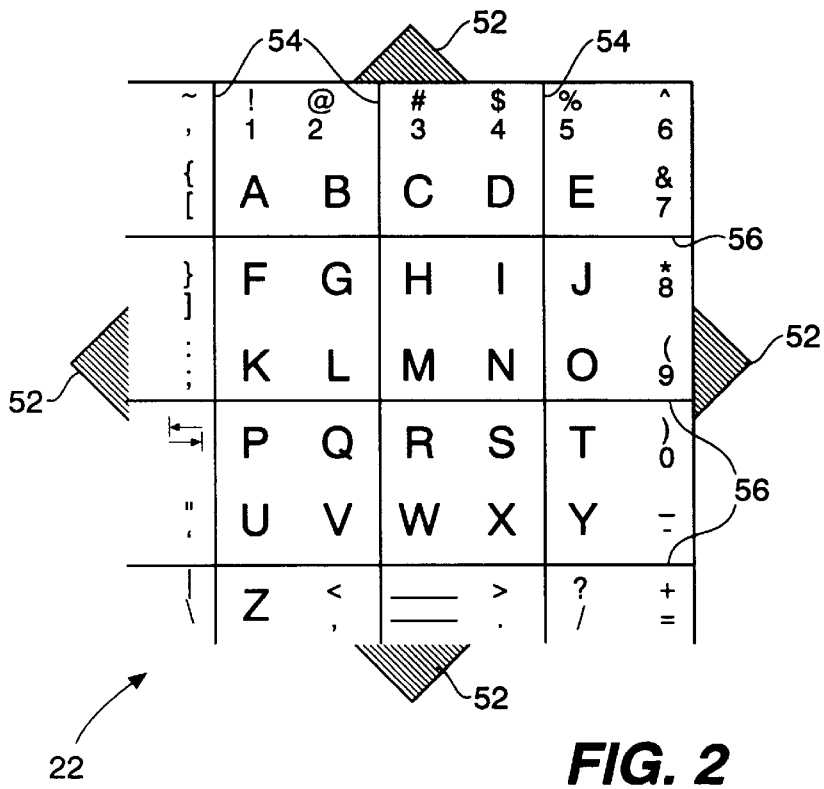
FIG. 2 illustrates a character keychart of the device, depicting characters corresponding to a typical keyboard having upper and lower case selections.

As shown in FIG. 2, the keychart 22 is square and has 49 character fields, each dimensioned to subtend an angle of 5 degrees, arranged in a 7×7 matrix. Each character field has one or more characters depicted upon it and can be highlighted individually by the LED array 24 (FIG. 1). In this specification, the term "character" embraces individual letters or symbols or combinations of letters and/or symbols, including words. The letters A to Y are arranged in a central 5×5 matrix of the character fields. The surrounding rectangular ring of 24 character fields carries the letter Z, the numerals 0 to 9, punctuation and other typographical symbols shown on the keys of a typical keyboard. As an aid to memory, the location of the numbers, the space bar, the period, comma and backslash correspond, to some extent, to their locations on the standard 101 keyboard. The space bar is represented by a rectangle in the middle of the bottom row and is the same in both upper and lower cases. The keychart 22 shows the letters A–Z in upper case, as would a typical keyboard, upper or lower case being selected as appropriate. The usual typographical symbols are shown with the lower case beneath the upper case in the usual way.

Figure 3:
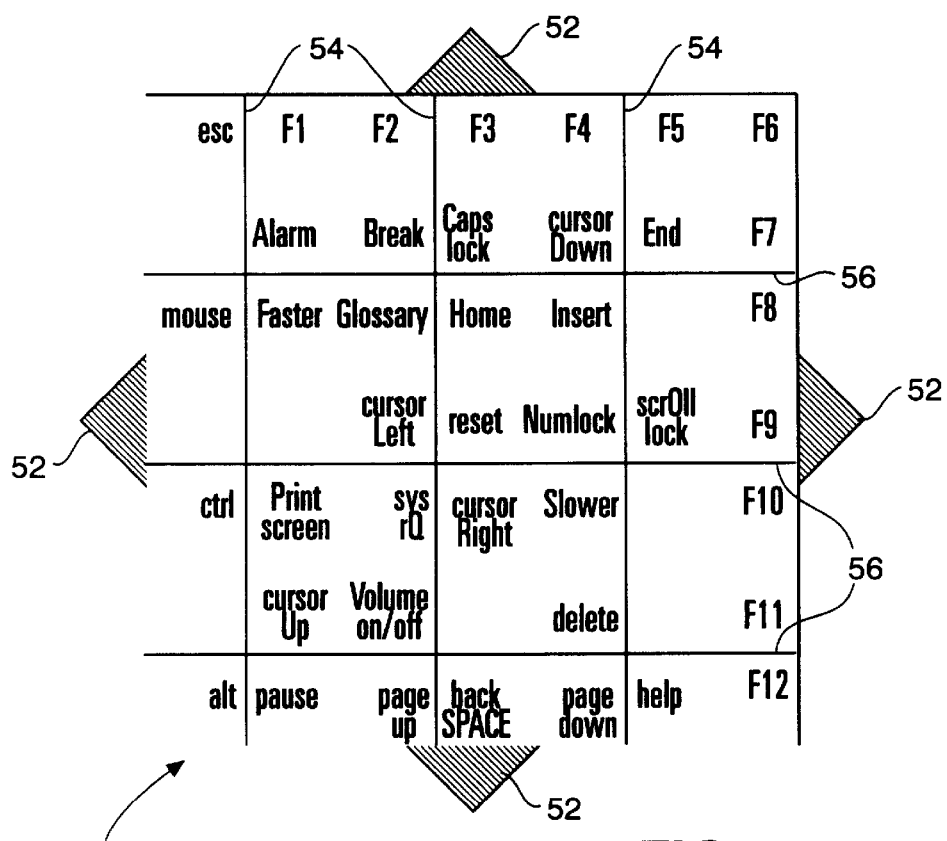
FIG. 3 illustrates a "COMMAND case" set of characters laid out according to the corresponding character fields of the keychart of FIG. 2.

The COMMAND case characters, which are primarily functional designations, are illustrated in FIG. 3. If the COMMAND case characters were displayed above the standard keyboard characters, the display would be very cluttered and intimidating to new or unsophisticated users. Therefore, the COMMAND case selections are based upon a combination of user memory, mnemonics based upon the (lower case) display and, if necessary, external text indicating the meaning of the COMMAND case positions, especially those in the perimeter fields which display punctuation marks or computer functions which do not lend themselves to mnemonics.

As shown, the function keys F1 to F10 correspond to the number keys 1 to 0, and function keys F11 and F12 follow keys F9 and F10 as the last two character fields of the outermost right hand column. The leftmost column represents the computer functions "esc", "ctrl" and "alt" together with a mouse selection function. These may be labelled externally of the 7×7 matrix. In the COMMAND case, the space bar corresponds to "backspace".

The other COMMAND case functions correspond to the alphabetical keys as follows:

a: ALARM e.g. sounds pulsating tone
b: Break
c: CapsLock (toggle—could be lit in use)
d: cursor Down (moves one position)
e: End
f: Faster
g: unused
h: Home
i: Insert
j: unused
k: Keypad toggle (for numbers and math operators)
l: cursor Left (moves one position)
m: reset
n: NumLock
o: scrOll-lOck (or Option for Apple computers)
p: Print screen
q: Sys RQ
r: cursor Right
s: Slower
t: unused
u: cursor Up (moves one position)
v: Volume on/off toggle
w: unused
x: delete i.e. cross out
y: unused
z: pause i.e. pauZe
?: Help Page up and Page down are positioned either side of the space bar and correspond to the symbols keyboard < and >, respectively.

In FIGS. 2 and 3, the keychart 22 shows four triangular markers 52, each adjacent the middle of each edge of the array. The markers identify the middle peripheral character fields which, with the centre character field, are used for calibration and training purposes. Before use by a particular user, the optical system needs to be calibrated to that user. For this purpose, the character fields M, 3, space, 9 and ";" are designated as training fields and the user is required to gaze at each of them in turn, commencing with the central field M and proceeding anticlockwise around the perimeter fields, the sequence being centre (M), left (;), bottom (space), right (9) and top (3). Thus, the training sequence begins with the system highlighting the central field M. When the system determines that the user has gazed at the field for a predetermined dwell period, the highlighting is removed. The user then gazes at the ";" field. When the system has detected that the eye is gazing near the ";" field, it highlights it, while the user continues to gaze at it. After a predetermined interval, say 300 milliseconds, the system removes the highlighting, signalling that the user should then gaze at the next training character field. This sequence is repeated until the user has gazed at all of the training fields. The complete sequence is repeated and the system is then calibrated. Successful completion may be indicated to the user by an audible tone or flickering of the highlighting.

Since apart from the initial training field M, the training fields are not highlighted until after the user has gazed at them, the user is required to remember the correct sequence for viewing them.

It should be noted that, apart from the initial highlighting of the centre training field, the highlighting follows the user's selection of the training field. This is consistent with subsequent operation in which, as will be described later, the highlight follows the user's action rather than prompting it. Furthermore, the user controls the pace of the training phase and so is not under pressure to keep up with the system. Nevertheless, it has been found in practice that the training phase can become very short.

The microcontroller 46 has a memory in which it stores data representing an array of character selection fields. For reasons which will become clear later, the character selection fields are not equal in size to the character fields. Rather, each character selection field subtends 10 degrees by 10 degrees. During the training sequence, the microcontroller 46 determines the eye positions corresponding to the five training character fields and interpolates from those measurements the eye positions corresponding to the remaining character fields. During subsequent use of the device, the microcontroller 46 will measure the eye's position and correlate with its character field map to determine the character field at which the user is gazing. The microcontroller 46 will also take into account any prior case selection to determine the set of characters "activated" and hence the character or function to output or action to perform.

During case selection, the microcontroller 46 treats certain cluster of character fields as case selection fields.

Figure 4:
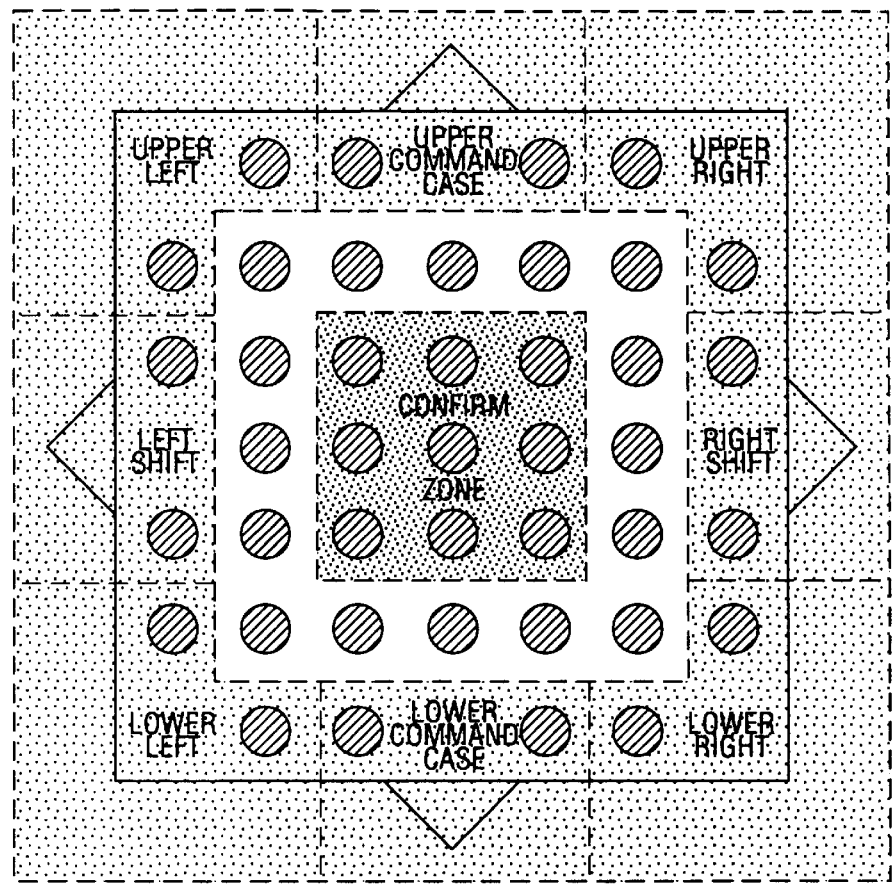
FIG. 4 illustrates case selection fields comprising clusters of character fields.

Once the system has been calibrated or trained, the user may begin selecting characters for display by the LCD display 48 or to control the computer, and so on. In most cases, each character selection is made by first selecting a case and then selecting a character field. The user selects the different cases by gazing at case selection fields of the keychart in a predetermined sequence. As will be described later, the system can differentiate between the user gazing at a particular character field to select the corresponding character, and gazing at the character field to select a case. As illustrated in FIG. 4, the case selection fields are disposed in a perimeter zone which is one character field (5 degrees) wide. At each corner, a cluster of three character fields form an L-shaped case selection field. These corner case selection fields correspond to the "unshifted" or "lower" case, which will be used most often. The corner fields are identified in FIG. 4 as UPPER RIGHT, UPPER LEFT, LOWER RIGHT AND LOWER LEFT, respectively, because they also serve as character subset selection fields. Selection of a particular corner subset selection field selects that subset of characters occupying the corresponding position in its four character group. The middle three character fields of the outer right hand column of the 7×7 matrix comprise a "RIGHT SHIFT" case selection field and the corresponding three middle character fields on the leftmost column are the "LEFT SHIFT" case selection field, both for selecting the upper case. The two sets of three character fields in the middle of the uppermost row and lowermost row, respectively, are the "COMMAND CASE" fields for selecting the COMMAND case characters of FIG. 3.

The central group of nine character fields, in a 3×3 array, constitute a confirmation field subtending 15×15 degrees. The remaining sixteen character fields, forming a rectangular ring between the confirmation field and the case selection fields, constitute a guard field which is passive.

In case selection mode, the detection system does not use the 10 degrees×10 degrees selection fields previously mentioned. The system will determine the selection using the boundaries shown in FIG. 4 between the case selection fields and the guard field and between the guard field and confirmation field. However, the boundary around the case selection fields is slightly larger than the 7×7 array of character fields to give a margin, as shown in FIG. 4, within which the eye may gaze to select the adjacent case selection field.

Thus, the user will first make a case selection by gazing at the appropriate case selection field. The system will highlight it and detect when the eye has dwelled upon a case selection field for 100 milliseconds or more. The user may scan the case selection fields, i.e. moving around from case to case, indefinitely, without confirming a selection. In order to confirm a case selection, the user must transfer his/her gaze from the chosen case selection field, across the guard field and onto the central confirmation field. The dwell time for confirmation is also 100 milliseconds, i.e. long enough to avoid accidental confirmation caused by an involuntary blink which typically lasts about 60 milliseconds. Because the case selection field is only one field wide, no other case selection field is passed during the transfer of the user's gaze to the confirmation field. Hence, unwanted selections during transit are avoided.

It should be noted that, until a case has been selected, the confirmation and guard fields are deactivated so that the user may rest his/her gaze there while considering which case to select.

The case selected is the last one highlighted prior to moving to the confirmation field. Once the case selection has been confirmed, the detection system switches to character selection mode. The user may then select a single character to be sent to the display device 48 and/or computer terminal. The manner in which a character is selected will be described in detail later.

Once the character selection has been confirmed, the system reverts to the case selection mode in which it uses the case selection fields and central confirmation field. However, if the previously selected character was in one of the perimetric case selection fields, or in the guard field, the whole keychart becomes passive until the user has gazed at the central confirmation field for 100 milliseconds, after which the perimetric case selection fields are re-activated. This prevents premature or unwanted case selection due to the gaze remaining on the perimetric case selection fields when the system reverts to case selection mode. Hence, the confirmation field serves also as a re-activation field for case selection. The procedure is also followed when there is a time-out of the case selection mode, as will be described later.

Referring again to FIG. 4, the corner case selection fields are associated with the unshifted or lower case, which is likely to be selected most often. Selection of this case requires only that the user gaze at one of the four corner selection fields and then confirm the selection by gazing at the confirmation field. For the other two cases, however, the user must first select a corner selection field followed by the adjacent SHIFT or COMMAND case field required. Once the corner selection field has been highlighted, the user shifts his/her gaze to the SHIFT or COMMAND case field to select it also. The chosen SHIFT or COMMAND case field also is highlighted, while the corner selection field highlighting persists. The user then confirms the selection by switching is/her gaze to the confirmation field. If, instead of confirming the selection, the user gazes at another corner selection field, the previous selection is negated, in which case the new corner selection field will be highlighted and the highlighting of the other two fields turned off.

Whenever, in this case selection mode, the gaze shifts from a SHIFT or COMMAND case field to a corner selection field, only the corner selection field will be highlighted and primed for confirmation. This enables the user to recover from a faulty SHIFT or COMMAND case field selection by shifting his/her gaze back to a corner selection field instead of to the confirmation field.

Since some computer software uses the right shift and left shift as commands, these fields may be selected without prior selection of a corner selection field, i.e. by gazing at the right shift field or left shift field and then at the confirmation field. Where such a selection is made, the system will return directly to the case selection mode instead of entering the character selection mode.

In the case selection mode, there are relatively few selection fields and they are relatively large. Selection of character fields subtending only 5 degrees by 5 degrees, however, would be difficult for many users. Consequently, the detection system is designed to use an effective character selection field of 10×10 degrees, i.e. the equivalent of a 2×2 array of character fields centered upon the selected character. The system will determine that the center character is being selected if the user's gaze is fixed anywhere within the 10 degrees×10 degrees area centered upon the corresponding character field. In order to center the boundaries of the 10 degrees×10 degrees character selection fields upon the character fields, the microcontroller 46 will offset the boundaries by the equivalent of 2.5 degrees or one half of a character field. The directions in which the boundaries are offset are determined by the corner case selection field the user selected before entering the character selection mode.

As shown in FIG. 2, on the keychart 22 itself, the grouping of the characters into blocks is by means of vertical lines 54 and horizontal lines 56 which divide the character fields into 9 complete groups of four and seven partial groups. For detection purposes, the three pairs of character fields of the leftmost column are each treated as half of a group extending off the lefthand edge of the chart and the three pairs of character fields in the bottom row are each treated as half of a group extending off the bottom edge of the chart. The solitary character field in the bottom left corner of the chart is treated as the upper right hand field of a group extending off the bottom left corner of the chart. It will be noted that there are no lines at the left hand edge and bottom edge, to facilitate recognition that the characters in the leftmost column and lower most row comprise parts of groups.

In addition, to facilitate detection using the larger character fields when in the character selection mode, the character fields are arranged in blocks. Each character is assigned to a quadrant of a block.

During character selection mode, the particular corner selected in the previous case selection mode i.e UPPER RIGHT, UPPER LEFT, LOWER RIGHT, LOWER LEFT will determine which characters in each block can be selected. Thus, before selecting a corner selection field in case selection mode, he/she first notes which quadrant, in its block, the character occupies. The user then selects the corresponding corner selection field followed, if necessary, by the SHIFT or COMMAND field. For example, UPPER RIGHT limits the character selection to the subset of characters occupying upper right quadrants.

Figure 5:
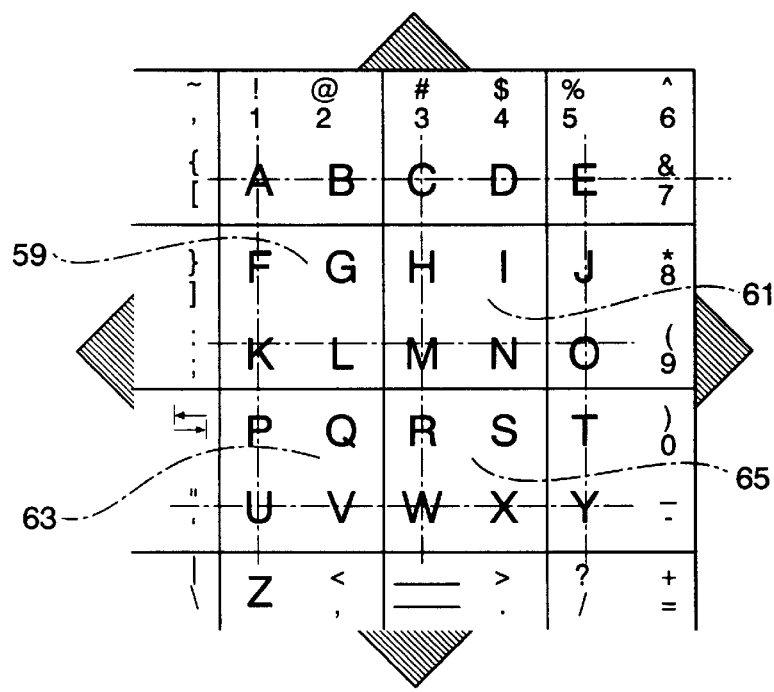
FIG. 5 illustrates character detection fields larger than individual character fields.

Following confirmation of the case selection, the microcontroller 46, enters the character mode. Only one of the characters in the upper right quadrant of each block, (2, 4, 6, G, I, 8, etc.) can be selected in the subsequent step. FIG. 5 illustrates four such 10×10 degrees character detection fields 60, 62, 64 and 66 corresponding to UPPER RIGHT having been selected. If the system detects that the eye is gazing at a position anywhere inside square 60, for the specified dwell interval, it will determine that the letter G is being selected. Likewise, fixation within square 62, 64 or 66 would select letter I, Q, or S.

Operation of the system under the control of microcontroller 46 will now be described with reference to the flowchart shown in FIG. 6. It is assumed that any training by a new user has been carried out as previously described.

Figure 6A:
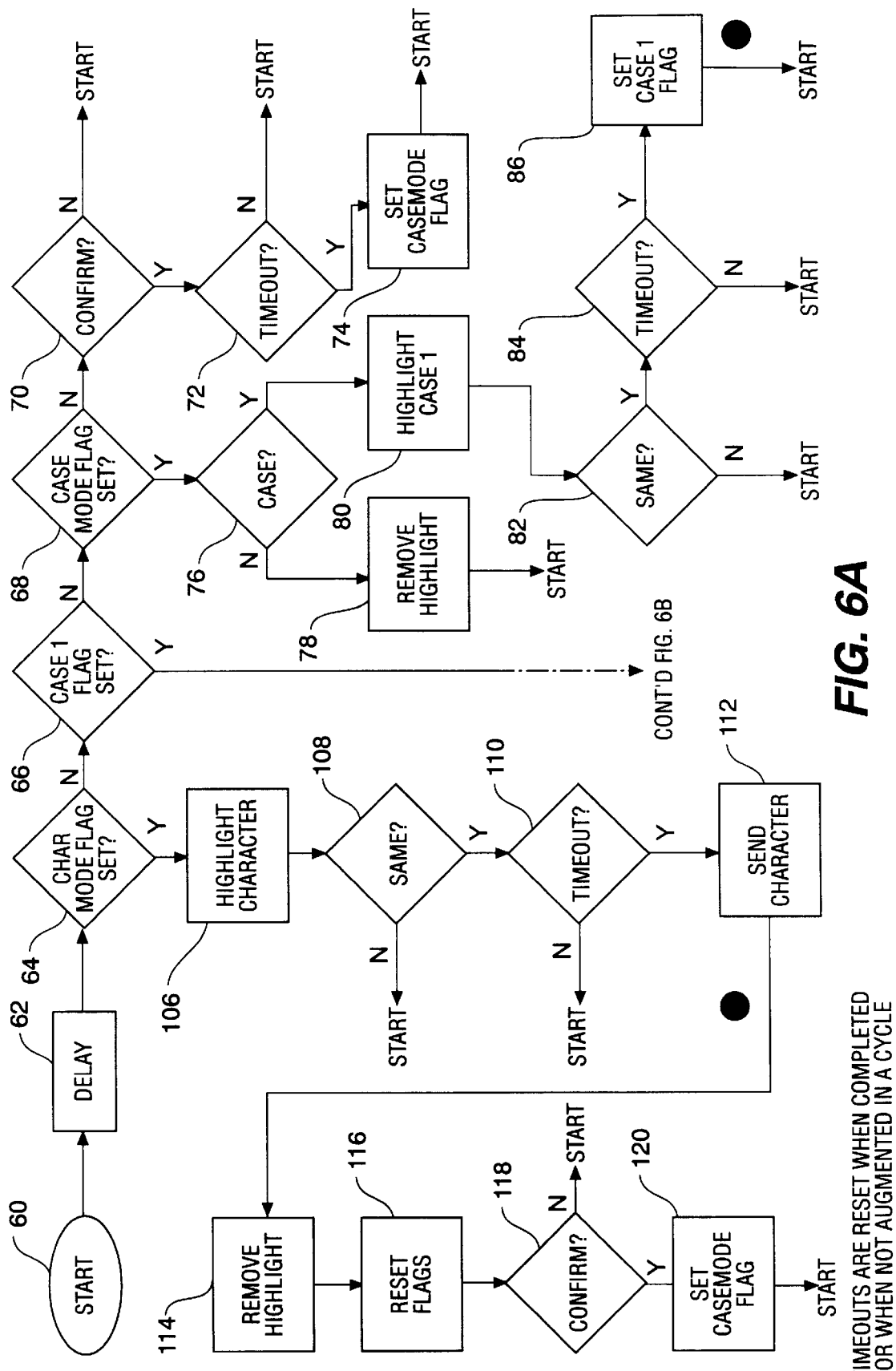
FIGS. 6A and 6B are a flowchart depicting operation of the eye-directed communications device.
Figure 6B:
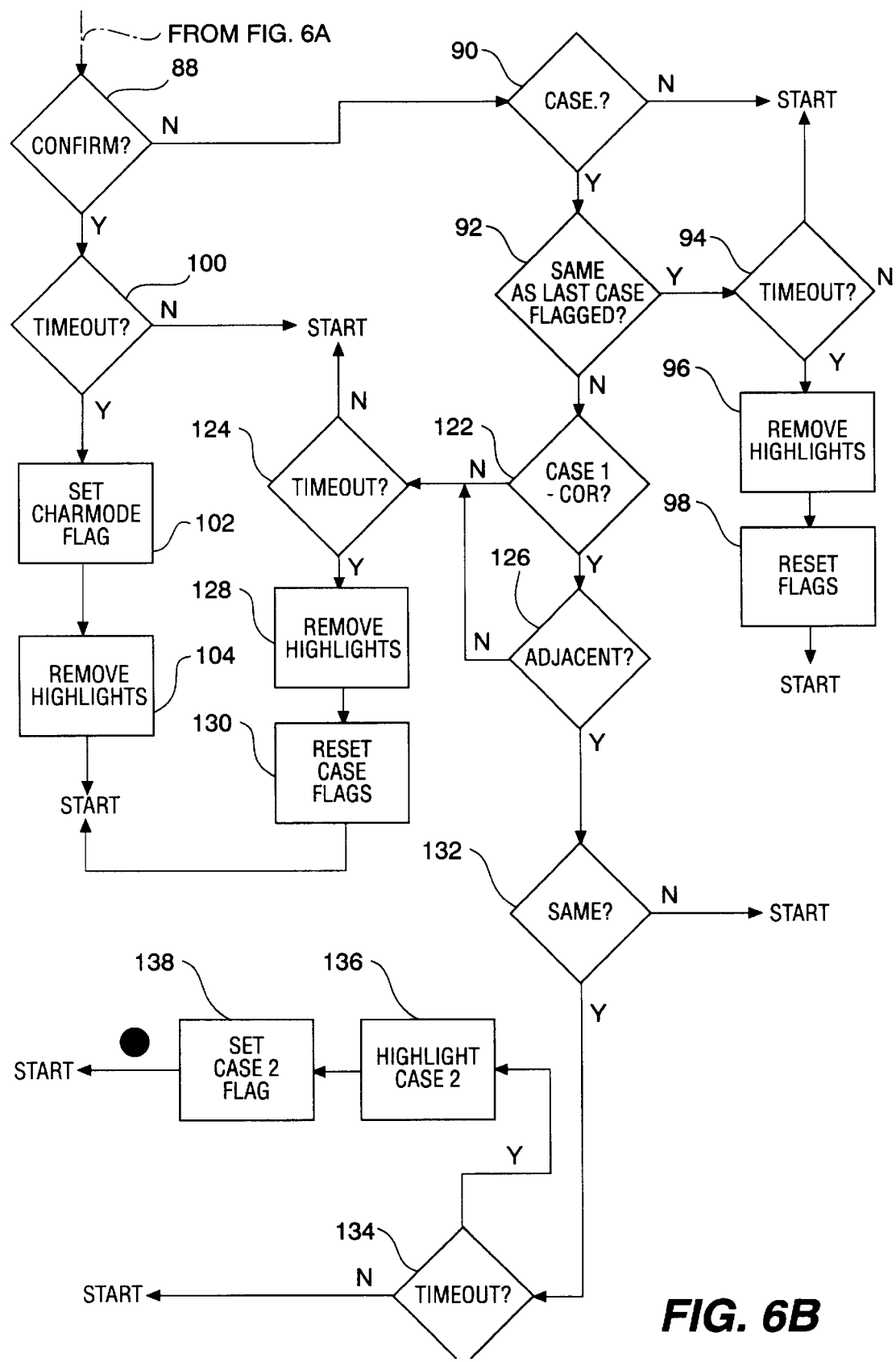
Figure 7:
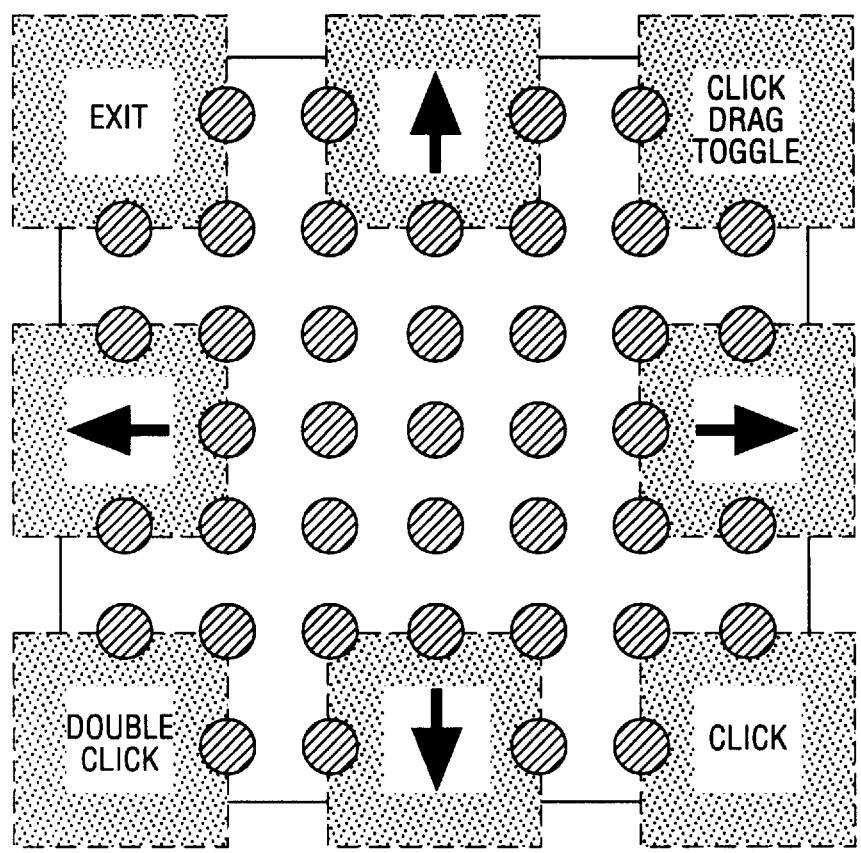
FIG. 7 illustrates fields activated in a "mouse" mode of operation.

Thus, in FIG. 6, the START function box 60 is followed by a 20 millisecond delay 62. The microcontroller 46 establishes, in decision step 64, CHAR MODE FLAG SET?, whether the system is in character selection mode or not. Assuming that use has just commenced, the flag will not be set, so the program will continue to decision step 66 "CASE 1 FLAG SET?" which determines whether or not the user has selected a case, i.e. lower case, Shift or Command. Since no case has yet been selected, the microcontroller will continue to decision step 68 "CASE MODE FLAG SET?" In some situations, namely when a previously-selected character was in one of the perimetric case selected fields, the CASE MODE FLAG will not be set. In this case, no previous selection has been made and the user is required to confirm a return to case selection mode by fixing on the central confirmation field. Hence, if the result of decision step 68 is negative, the microcontroller will determine in decision step 70 whether or not the user is gazing at the confirmation field. If the user is not, the microcontroller returns from decision step 70 to START. If the user is gazing at the confirmation field, time-out counter 72 is initiated. For counts less than five, the time-out counter 72 returns the program to START and the cycle repeats. After five cycles, i.e. when the user has gazed at the CONFIRMATION Field for 100 milliseconds, the time-out counter 72 will "time-out" and function step 74 will set the CASE MODE FLAG and return the program to START. Time-out counter 72, resets to zero when completed or when not augmented in a cycle, as indeed, do any other time-out counters shown in the flowchart.

During the next cycle, when decision step 68 CASE MODE FLAG SET? is reached, the result will be positive and the program will proceed to decision step 76, CASE? Which determines whether or not the user is gazing at a character field in one of the perimetric case selection fields. If not, i.e. the user is gazing at the guard field, or still gazing at the confirmation field, the program returns to START via REMOVE HIGHLIGHT step 78. The latter removes any highlighting which may have been turned on because the user's gaze had strayed onto an unwanted case selection field.

The cycle will repeat until the user is determined to be gazing at a case selection field, whereupon the result of CASE? decision step 76 will be positive and HIGHLIGHT CASE 1 step 80 will highlight the selected case, identified in FIG. 6 as case 1. In decision step 82, SAME?, the microcontroller 46 determines whether or not the user is still gazing at the same character as in the previous cycle. If not, and the result of decision step 82 is negative, the program returns to start. If the user gazes at the same case selection field for 100 milliseconds, however, time-out 84 (another 5 count counter) and function step 86 set the CASE 1 FLAG and return the program to START. At this stage, the selected case selected field is highlighted, but the user is now required to confirm the selection.

During the next cycle, the result of decision step 66, CASE FLAG SET?, will be positive and the program will proceed to CONFIRM? step 88 which determines whether or not the user's gaze has been transferred to the confirmation field for the prescribed 100 milliseconds. Initially, it will not have been, since the eye movement usually takes more than 20 milliseconds. Consequently, the program must determine whether the selection is being abandoned, or a second case is being selected. It should be noted that, in some cases, the user will select a corner case followed by SHIFT or COMMAND case before confirming the selection. Hence, step 90 CASE? determines whether or not the user is gazing at a case selection field. If not, the program returns to START. If the result of CASE? step 90 is "YES", however, step 92, SAME AS LAST CASE FLAGGED?, determines whether or not the case selection field being gazed upon is the same as that previously selected and highlighted. If it is, time-out counter 94 returns the program to START. The function of time-out counter 94 is to permit a faulty case selection to be cancelled. To cancel the selection, the user stares at the highlighted case selection field for a couple of seconds, following which time-out counter 94 turns off the highlighting in step 96 REMOVE HIGHLIGHTS, resets the flags in step 98 RESET FLAGS and the program returns to START. The user will then be required to start the case selection process again by gazing at the central CONFIRMATION Field to reactivate the case selection fields.

Assuming that, following highlighting of the case selection field, the user wishes to confirm the case selection and transfers his/her gaze to the CONFIRMATION Field, the result of step 88 CONFIRM? will be a YES. If the user does not gaze at the CONFIRMATION Field for 100 milliseconds, however, time-out counter 100 will return the program to START. Once the user has gazed at the CONFIRMATION Field for 100 milliseconds, time-out counter 100 will time-out, SET CHARMODE FLAG step 102 will set the character mode flag, REMOVE HIGHLIGHTS step 104 will turn off the highlighting of the case selection field(s) and the program will return to START.

The confirmation and case selection fields thus are "deactivated" and the system is in its character selection mode, in which the user is required to select a particular character by gazing at it. Consequently, the system now will determine the specific character field upon which the user's gaze is next fixed. In order to do this,the microcontroller 46 will use the 10 degrees×10 degrees character selection field boundaries, offsetting them vertically and horizontally towards the corner which was selected, alone or in combination, during the preceding case selection mode.

During the next cycle, since the character mode flag has been set, the result of CHAR MODE FLAG SET? step 64 will be a "YES". Accordingly, in step 106 HIGHLIGHT CHARACTER, the microcontroller 46 will highlight the character field at which the eye is gazing. Subsequent step 108 SAME? determines whether or not the character being viewed is the same as during the previous cycle. If not, the program returns immediately to START. If it is the same, time-out counter 110 is initiated. If the user continues to gaze at the highlighted character, eventually time-out counter 110 will time-out and SEND CHARACTER step 112 will cause the highlighted character to be sent to the display 48 and/or the RS 232 port. The display 48 will only respond to, and display, the typographical characters, whereas the computer terminal will also respond to the various functions of the COMMAND case. Subsequently, in REMOVE HIGHLIGHT step 114, the microcontroller 46 will turn off the backlighting of the selected character and reset the various mode flags in step 116. The time-out period of counter 110 is between, say, 300 milliseconds and 500 milliseconds, which is longer than that of the other time-out counters. The user can change the actual duration setting by selecting the COMMAND case character FASTER or SLOWER (see FIG. 3).

The microcontroller 46 then determines in CONFIRM? step 118 whether or not the selected character field was in the CONFIRMATION Field. If it was, the program can immediately enter the case selection mode, set the case selection mode flag SET CASEMODE FLAG step 120, and return to START. The saving of 100 milliseconds or so obtained in this way is significant because the characters in the confirmation field are letters, which are likely to be selected more frequently.

As previously described, prior to selecting a case, the user will determine the quadrant in which the character to be selected is located. During the subsequent case selection process, the user will need to choose the corresponding corner selection field, in combination with a SHIFT field or a COMMAND field, i.e. make two case selections. Occasionally, the user will make an incorrect case selection and wish to abort it. These situations are handled as follows.

Assuming that the user has selected the first case and CASE 1 FLAG SET? step 66 has yielded a YES, the microcontroller will be at CONFIRM? step 88 trying to establish whether or not the user is gazing at the CONFIRMATION Field. In this case, the user will still be gazing at the perimetric ring of fields, though at a different case selection field, so CONFIRM? step 88 will yield a NO decision. CASE? step 90 will produce a YES since the gaze will be fixed upon a case selection field. However, step 92 SAME AS LAST CASE FLAGGED? will give a NO decision. Step 122 CASE 1=COR? will determine whether or not the previous case selected was one of the corner selection fields, UPPER RIGHT, UPPER LEFT, LOWER RIGHT or LOWER LEFT. If it was not a corner selection field, a time-out counter 124 returns to START, after the usual 100 milliseconds, and the user is required to select a first case again. Time-out counter 124 reduces the likelihood of an accidental selection caused by the blink of the eye.

If the previous case was one of the corner cases, CASE 1=COR? step 122 yields a YES and step 126 ADJACENT? determines whether or not the case selection field now being viewed is adjacent the case selection field previously selected and highlighted. If it is not adjacent, time-out counter 124 again returns the program to START since the combination of case selection fields cannot be valid. When the time-out counter 124 has recorded it for the prescribed five cycles, REMOVE HIGHLIGHTS step 128 and RESET CASE FLAGS step 130 turn off the highlighting of the CASE 1 case selection field and reset the CASE flags.

If the new case selection field is adjacent the previously-selected corner selection field, ADJACENT? step 126 yields a YES result and SAME? step 132 determines whether or not the second case selection field is the same as in the previous cycle. When the second case selection has persisted for the usual 100 milliseconds, as counted by time-out counter 134, the second case selection field is highlighted by HIGHLIGHT CASE 2 step 136, the second case selection flag is set by SET CASE 2 FLAG step 138 and the program returns to START. In the event that the user is merely scanning the case selection fields, and the conditions of SAME? step 132 and time-out counter 134 are not met, the program returns to start without highlighting the second case selection field.

Optionally, completion of either a selection or a character selection may be accompanied by an audible or visual signal, as represented by the dots adjacent SET CASE 1 FLAG step 86, SEND CHARACTER step 112 and SET CASE 2 FLAG step 138.

It should be noted that it is possible to select one of the middle case selection fields and confirm it immediately i.e. without first choosing a corner selection field. In this way, RIGHT SHIFT and LEFT SHIFT can be selected, as required by some computer programs. In the same way, selection of the upper COMMAND field operates an ON/OFF toggle to deactivate/reactivate the system and selection of the lower COMMAND field selects the usual ENTER keyboard command. The ON/OFF command enables the user to shut the system down temporarily and scan the general environment, i.e., the keychart or peripheral equipment without making a selection.

It should be noted that there is a slight difference between the CASE 1 flag and the CASE 2 flag. For a CASE 1 flag, the highlight is first turned on and the flag eventually becomes set 100 milliseconds later. For a CASE 2 flag, however, the user must gaze at the case selection field for 100 milliseconds before the highlighting is turned on and the CASE 2 flag set.

Referring again to FIG. 3, selection of the character field "mouse" in the COMMAND case et of characters causes the system to switch to a "mouse" mode in which the perimeter fields become mouse function fields. Selection of these mouse function fields can be effected in the same way as the case Selection fields and will control an external computer monitor in the same way as a conventional mouse. Thus, the middle fields select the four directions of movement, the dwell time determining the distance travelled, the upper right corner selects the functions "click", "drag", "toggle"; the bottom right corner selects "click"; the bottom left corner the Double Click function and the top left corner exits the "mouse" function and returns to the case selection mode.

It is also envisaged that, where an active keychart is used, the mouse function could be used in the character/case selection process and perhaps for other purposes, such as to control a graphics computer interface displayed within the eyepiece.

The invention embraces various alternatives and modifications to the embodiment described above, Thus, for example, instead of the groups of characters being separated by dividing lines, each group could be associated by means of a central four point star. Alternatively, the keychart could have a checkerboard pattern, each check accommodating four characters.

While the preferred embodiment uses a central confirmation field selected by the eye, it is envisaged that the system could have a manual input, for example a pushbutton or puff/blow switch, for the user to confirm selections. Such a manual input could replace or supplement the eye-directed confirmation. Equally, such a manual input could be used instead of the time-out to confirm character selection.

Although the above-described embodiment has a single, static keychart 22, it is envisaged that the keychart could be provided by an active display, for example a liquid crystal display, capable of displaying several different charts according to the case selected.

It is also envisaged that two interchangeable keycharts might be provided, one for case selection and the other for character selection. This might be implemented using a holographic plate as hte keychart 22, and two lamps in place of lamp 28. The keychart display would then be changed by alternately turning on the lamps.

As an aid to their selection, the case selection fields may be shown superimposed upon the keychart character matrix, perhaps by emphasizing the corresponding character, shading the corresponding area of the keychart, colour coding, or depicting special symbols, such as arrows or eyes, for the shifted and COMMAND cases. The selection fields are shown square but could be other shapes, such as rectangular, rhomboidal, circular or polygonal.

Although the specific embodiment is a communications aid for people with physical disabilities, it should be appreciated that embodiments of the invention could be used for other purposes, such as to allow a user to control and/or provide input to a virtual reality system or video game, or provide "hands-free" control and communications in other situations, such as in aircraft or spacecraft.

Embodiments of the invention need not always be mounted to an eyeglass frame but could, for example, be carried by a headband or helmet.

It should be appreciated that the invention is not limited to eye-directed devices but also embraces devices which employ other means of character selection, such as a head-mounted pointing device, or even a hand-held optical pointer.

Although an embodiment of the invention has been described and illustrated in detail, it is to be clearly understood that the same is by way of illustration and example only and is not to be taken by way of the limitation, the spirit and scope of the present invention being limited only by the appended claims.

What is claimed is:

1. Visual communications apparatus comprising:
   display means for displaying characters in a field of view of a user's eye, the characters being arranged in a plurality of groups, each character occupying in its group one of a plurality of positions which positions are similar for all groups;
   user-controlled means for controlling light to select one of said plurality of characters and comprising detection means for detecting changes in said light and providing corresponding position signals, and processor means defining boundaries of a plurality of selection fields and determining, in response to the position signals, which of the selection fields has been selected by the user;
   the selection fields comprising character selection fields and position selection fields, the processor means being responsive to an initial selection of a position selection field to limit subsequent selection to a subset of said characters which each occupy a corresponding position in each group, and subsequently determining from the position signals the specific one of said subset of characters chosen by the user.

2. Apparatus as claimed in claim 1, wherein the characters are arranged in a rectangular array and groups of characters in blocks of four, each block comprising four quadrants, the position selection fields being disposed adjacent respective corners of the array.

3. Apparatus as claimed in claim 1, wherein the characters are spaced from one another by a set pitch, the width and height of the selection fields are greater than said pitch, and the processor means centers the selection fields upon the characters of the subset following said selection of a position selection field.

4. Apparatus as claimed in claim 1, wherein the user-controlled means comprises means for directing light onto an eye of the user, said light being reflected from the eye, the detecting means detecting eye position from light reflected from the eye and producing said position signals corresponding to a direction in which the eye is gazing.

5. Apparatus as claimed in claim 1, wherein, following selection of a character, the processing means deactivates all but a relatively small one of said selection fields and reactivates the remaining selection fields in response to subsequent selection by the user of said one of said selection fields.

6. Apparatus as claimed in claim 5, wherein the said one of said selection fields is located within a peripheral zone of the display.

7. Apparatus as claimed in claim 1, wherein the processor means stores several sets of said characters, one of the sets being displayed by the display means, the processor correlating the characters of a set which is not displayed with the characters of the set which is displayed, and defining case selection fields for selecting one or other of the sets of characters, the processor detecting an initial user-selection of a case selection field and a subsequent user-selection of a displayed character, and determining to be the selected character either the displayed character or a correlated character from the other set in dependence upon the case selection.

8. Apparatus as claimed in claim 7, wherein, following selection of a character, the processing means deactivates all but one of said selection fields and reactivates the remaining selection fields in response to subsequent selection by the user of said one of said selection fields.

9. Apparatus as claimed in claim 8, wherein the said one of said selection fields is located within a peripheral zone of the display.

10. Apparatus as claimed in claim 7, wherein the selection fields comprise peripheral case selection fields and a central confirmation selection field, the processor means determining user-selection of a case selection field and the central confirmation field to determine that the set of characters has been selected and to correlate the position signals with the character selection field for the subsequent character selection.

11. Apparatus as claimed in claim 10, wherein the case selection fields and the confirmation field are segregated by a passive guard field, the processor means not responding with action when the user is determined to gaze at the guard field.

12. Apparatus as claimed in claim 11, wherein the display subtends an angle of about 35 degrees to the eye of the user, the confirmation field subtends an angle of about 15 degrees, and the guard field has a width subtending an angle of about 5 degrees.

13. Apparatus as claimed in claim 10, wherein the processor limits, alternatively, selection to a first set of character upon selection of a corresponding first case selection field and the confirmation field, selection to a second set of characters upon selection of both a first case selection field and a corresponding second case selection field and the confirmation field, and selection to a third set of characters upon selection of both a first case selection field, a corresponding third case selection field and the confirmation field.

14. Apparatus as claimed in claim 13, wherein the first case selection fields correspond to corner groups of character fields.

15. Apparatus as claimed in claim 13, wherein the processor means highlights a selected first case until the confirmation field has been selected, or a different case selection field has been selected or a predetermined period has elapsed with neither occurring.

16. Apparatus as claimed in claim 10, wherein the display is dimensioned and positioned so as to subtend an angle of substantially 35 degrees to the eye of the user, and the confirmation field is dimensioned to subtend an angle of about 15 degrees to the eye of the user.

17. Apparatus as claimed in claim 7, wherein each position selection field is coincident with a case selection field.

18. Apparatus as claimed in claim 1, wherein the display is dimensioned and positioned so as to subtend an angle of between 25 and 40 degrees to the eye of the user.

19. Visual communications apparatus comprising:
 display means for displaying characters in a field of view of a user's eye,
 user-controlled means for controlling light to select one of said plurality of characters and comprising detection means for detecting changes in said light and providing corresponding position signals, and processor means defining boundaries of a plurality of selection fields comprising character selection fields and case selection fields, and determining in response to the position signals which of the selection fields has been selected by the user;
 the processor means storing a plurality of sets of characters and being responsive to an initial user-selection of a case selection field to limit subsequent selection to a corresponding one of said sets of characters, and subsequently to user-selection of a character selection field to determine the character selected by the user.

20. Apparatus as claimed in claim 19, wherein the user-controlled means comprises means for directing light onto an eye of the user, said light being reflected from the eye, the detecting means detecting eye position from light reflected from the eye and producing said position signals corresponding to a direction in which the eye is gazing.

21. Apparatus as claimed in claim 20, wherein, following selection of a character, the processing means deactivates all but a relatively small one of said selection fields and reactivates the remaining selection fields in response to subsequent selection by the user of said one of said selection fields.

22. Apparatus as claimed in claim 21, wherein the said one of said selection fields is located within a peripheral zone of the display.

23. Apparatus as claimed in claim 20, wherein the selection fields comprise peripheral case selection fields and a central confirmation selection field, the processor means determining user-selection of a case selection field and the central confirmation field to determine that the set of characters has been selected and to correlate the position signals with the character selection field for the subsequent character selection.

24. Apparatus as claimed in claim 23, wherein the case selection fields and the confirmation field are segregated by a passive guard field, the processor means not responding with action when the user is determined to gaze at the guard field.

25. Apparatus as claimed in claim 24, wherein the processor means highlights a selected first case until the confirmation field has been selected, or a different case selection field has been selected or a predetermined period has elapsed with neither occurring.

26. Apparatus as claimed in claim 24, wherein the display subtends an angle of about 35 degrees to the eye of the user, the confirmation field subtends an angle of about 15 degrees, and the guard field has a width subtending an angle of about 5 degrees.

27. Apparatus as claimed in claim 23, wherein the processor limits, alternatively, selection to a first set of character upon selection of a corresponding first case selection field and the confirmation field, selection to a second set of characters upon selection of both a first case selection field and a corresponding second case selection field and the confirmation field, and selection to a third set of characters upon selection of both a first case selection field, a corresponding third case selection field and the confirmation field.

28. Apparatus as claimed in claim 27, wherein the first case selection fields correspond to corner groups of character fields.

29. Apparatus as claimed in claim 23, wherein the display is dimensioned and positioned so as to subtend an angle of substantially 35 degrees to the eye of the user, and the confirmation field is dimensioned to subtend an angle of about 15 degrees to the eye of the user.

30. Apparatus as claimed in claim 19, wherein the display is dimensioned and positioned so as to subtend an angle of between 25 and 40 degrees to the eye of the user.

31. Visual communications apparatus comprising:

a viewing port; display means for displaying characters for viewing by a user's eye by way of the viewing port; and eye-position monitoring means for monitoring eye-position to determine a character selected by the user, the eye-position monitoring means comprising infrared light source means, infrared receiver and a dichroic beam splitter, the dichroic beam splitter transmitting visible light incident thereupon along a first optical path and reflecting infrared light incident thereupon along a second optical path, the first optical path extending between the beam splitter and the display means and the second optical path extending between the beam splitter and both of the infrared light source means and the receiver means, the arrangement being such that infrared light from the infrared light source means is reflected by the beam splitter towards the viewing port, infrared light front the viewing port is reflected by the beam spliter towards the infrared light receiver means, and visible light from the display means is transmitted by the beam splitter towards the viewing port.

32. Apparatus as claimed in claim 31, wherein the display is dimensioned and positioned so as to subtend an angle of between 25 and 40 degrees to the eye of the user.

33. Eye-directed communications apparatus comprising:

display means for displaying characters within a field of view of a user and means for monitoring a user's eye position to determine characters selected by the user, the display means being arranged to display each character in a corresponding character field, the monitoring means including a processor means programmed to calibrate the monitoring means by a training procedure in which the user directs the eye in a predetermined sequence upon a predetermined number of character fields, the processor means highlighting each selected character field, after that selected first, only after the eye has dwelled within a limited region surrounding that field and extinguishing the highlighting when measurement at that point is completed.

34. Apparatus as claimed in claim 33, wherein the predetermined number of character fields is five, comprising a central character field and four peripheral fields.

35. Apparatus as claimed in claim 34, wherein the predetermined number of character fields comprise a central field and four peripheral fields, the peripheral fields being, respectively, directly above, below and to each side of the central field.

36. Apparatus as claimed in claim 35, wherein the processor means limits user-selection of the training fields to a sequence, beginning with the central field and continuing in either a clockwise or an anticlockwise direction around the perimetric fields.

37. Visual communications apparatus comprising:

display means for displaying characters in a field of view of a user's eye, the characters being arranged in a plurality of groups, each character occupying in its group one of a plurality of positions which positions are similar for all groups;

user-controlled means for controlling light to select one of said plurality of characters and comprising detection means for detecting changes in said light and providing corresponding position signals, and processor means defining boundaries of a plurality of selection fields and determining, in response to the position signals, which of the selection fields has been selected by the user;

the selection fields comprising character selection fields and character subset selection fields, the character selection fields corresponding to character positions, the character subset selection fields being equal in number to the number of characters in each group, the positions of the character subset selection fields relative to each other corresponding to the positions of the character in each group relative to each other, the processor means being responsive to an initial selection of a character subset selection field to limit subsequent selection of a character to that subset of said characters which each occupy that position in the group corresponding to the selected character subset selection field, and subsequently determining from the position signals subsequent selection by the user of a character selection field for a specific one of said subset of characters.

38. Apparatus as claimed in claim 37, wherein the characters in each group are in rectangular blocks of four, each block comprising four quadrants, there being four character subset selection fields each disposed adjacent to a respective corner of a rectangle.

39. Apparatus as claimed in claim 38, wherein the characters are spaced from one another by a set pitch, the width and height of the character selection fields are greater than said pitch, and the processor means centers the character selection fields upon the characters of the subset following said selection of a character subset selection field.

40. Apparatus as claimed in claim 37, wherein the characters are spaced from one another by a set pitch, the width and height of the character selection fields are greater than said pitch, and the processor means centers the character selection fields upon the characters of the subset following said selection of a character subset selection field.

* * * * *